(12) United States Patent
Newbold

(10) Patent No.: US 12,370,930 B2
(45) Date of Patent: Jul. 29, 2025

(54) PASSENGER SEAT LEG ENERGY ABSORBER

(71) Applicant: Safran Seats USA LLC, Gainesville, TX (US)

(72) Inventor: Tyler Newbold, Sherman, TX (US)

(73) Assignee: Safran Seats USA LLC, Gainesville, TX (US)

( * ) Notice: Subject to any disclaimer, the term of this patent is extended or adjusted under 35 U.S.C. 154(b) by 168 days.

(21) Appl. No.: 18/274,860

(22) PCT Filed: Feb. 10, 2021

(86) PCT No.: PCT/US2021/017477
§ 371 (c)(1),
(2) Date: Jul. 28, 2023

(87) PCT Pub. No.: WO2022/173429
PCT Pub. Date: Aug. 18, 2022

(65) Prior Publication Data
US 2024/0109464 A1    Apr. 4, 2024

(51) Int. Cl.
*B60N 2/427* (2006.01)
(52) U.S. Cl.
CPC ............... *B60N 2/42709* (2013.01)
(58) Field of Classification Search
CPC .................................. B60N 2/42709
USPC ..................................... 297/216.2
See application file for complete search history.

(56) References Cited

U.S. PATENT DOCUMENTS

| 4,440,441 A * | 4/1984 | Marrujo ............ B60N 2/42709 |
| | | 297/216.2 |
| 6,412,864 B1 * | 7/2002 | Larson .............. B60N 2/42736 |
| | | 297/216.2 |
| 8,226,163 B1 | 7/2012 | Pearson et al. |
| 8,393,574 B2 * | 3/2013 | Kismarton ......... B64D 11/0649 |
| | | 297/216.2 |
| 2011/0278887 A1 | 11/2011 | Trimble et al. |
| 2013/0283959 A1 | 10/2013 | Oyama et al. |
| 2017/0274999 A1 | 9/2017 | Alamgir et al. |

FOREIGN PATENT DOCUMENTS

| EP | 0877674 B1 | 11/2009 |
| WO | 2020091755 A1 | 5/2020 |

OTHER PUBLICATIONS

European Application No. 21709847.4, Office Action mailed on Dec. 4, 2024, 7 pages.
International Patent Application No. PCT/US2021/017477, International Search Report and Written Opinion, dated Nov. 8, 2021.

* cited by examiner

*Primary Examiner* — Anthony D Barfield
(74) *Attorney, Agent, or Firm* — Kilpatrick Townsend & Stockton LLP

(57) ABSTRACT

A passenger seat assembly includes a leg, a crushable insert, and a connector assembly. The leg includes an end and a slot extending through the leg proximate to the end, and the slot has a first slot end a second slot end. The crushable insert is retained within the slot, and the connector assembly may connect the leg with a track fitting assembly. The connector assembly includes at least one connector that is at least partially positioned within the slot between the second slot end and the crushable insert such that the connector deforms the crushable insert during a dynamic event.

15 Claims, 5 Drawing Sheets

PASSENGER SEAT LEG ENERGY ABSORBER

FIELD OF THE INVENTION

The field of the invention relates to passenger seat assemblies, and, more particularly, to energy-absorbing components of passenger seat assemblies.

BACKGROUND

Passenger vehicles, such as aircraft, buses, trains, ships, and automobiles, include passenger seats in Which passengers can be seated and otherwise use during travel. During travel, dynamic events can occur that can cause large transfers of energy over short periods of time. Some examples of dynamic events can include, but are not limited to, turbulence, collisions, large swells, and the like. During the dynamic event, an amount of energy large enough to cause the passenger seats to fail, and, if the passenger seats fail, various consequences could occur including property damage and bodily damage including loss of life.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat may include a leg, a crushable insert, and a connector assembly. The leg may include an end and a slot extending through the leg proximate to the end. The slot may be elongated in a direction extending away from the end and may include a first slot end proximate to the seat leg end and a second slot end opposite from the first slot end such that the first slot end is between the second slot end and the seat leg end. The crushable insert may be retained within the slot. The connector assembly may be configured to connect the leg with a track fitting assembly. The connector assembly may include a connector extending at least partially through the slot between the second slot end of the slot and the crushable insert, and the connector may be configured to deform the crushable insert during a dynamic event.

In some embodiments, the connector of the connector assembly is a first connector, and the connector assembly may additionally include a second connector and a support. The support may connect the first connector with the second connector. The second connector may be configured to connect the leg with the track fitting assembly. In certain embodiments, the passenger seat assembly may additionally include the track fitting assembly. In various embodiments, the connector may be configured to move within the slot during the dynamic event.

In some embodiments, the leg may additionally include an aperture in the end providing access to the slot, and the crushable insert may be insertable into the slot via the aperture. In certain embodiments, the passenger seat assembly may additionally include a retaining bracket coupled to the seat leg end and covering aperture, and the retaining bracket may be configured to retain the crushable insert within the slot.

According to certain embodiments of the present invention, a passenger seat includes a leg and a connector assembly. The leg may include an end and a slot extending through the leg. The connector assembly may include a first connector, a second connector, and a support. The first connector may be retained at least partially within the slot, and the first connector may be movable within the slot during a dynamic event. The second connector may be configured to connect the seat leg end with a track fitting assembly. The support may connect the first connector and the second connector.

In some embodiments, the passenger seat assembly may additionally include a crushable insert retained within the slot. The first connector may be between an end of the slot and the crushable insert, and the first connector may be configured to deform the crushable insert during the dynamic event. In various embodiments, the leg may additionally include an aperture in the end providing access to the slot, and a crushable insert may be insertable into the slot via the aperture. In certain embodiments, the passenger seat assembly may additionally include a retaining bracket coupled to the seat leg end and covering aperture and the crushable insert. The retaining bracket may be configured to retain the crushable insert within the slot.

In some embodiments, the passenger seat assembly additionally includes the track fitting assembly. In various embodiments, the support of the connector assembly may at least partially covers the slot. In certain embodiments, the slot may extend through the leg from a first side of the leg to a second side of the leg. In some embodiments, the slot may include a retaining groove within the slot and extending along a length of the slot. A width of the slot may be less than a width of the retaining groove.

According to certain embodiments of the present invention, a passenger seat assembly includes a leg, a crushable insert, and a connector assembly. The leg may include an end and a slot extending through the leg proximate to the end. The slot may be elongated in a direction extending away from the end and may include a retaining groove extending along a length of the slot. The crushable insert may be retained within the slot and within the retaining groove. The connector assembly may be configured to connect the leg with a track fitting assembly. The connector assembly may include a connector extending at least partially through the slot. The connector may be configured to deform the crushable insert during a dynamic event.

In some embodiments, the slot may include a first slot end proximate to the seat leg end and a second slot end opposite from the first slot end such that the first slot end is between the second slot end and the seat leg end. The connector may extend through the slot between the crushable insert and the second slot end. In various embodiments, a width of the slot may be less than a width of the retaining groove. In certain embodiments, the connector of the connector assembly may be a first connector, and the connector assembly may additionally include a second connector and a support. The support may connect the first connector with the second connector, and the second connector may be configured to connect the leg with the track fitting assembly.

In some embodiments, the passenger seat assembly may additionally include the track fitting assembly. In various embodiments, the leg may additionally include an aperture in the end providing access to the slot, and the crushable insert may be insertable into the slot via the aperture.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "forward," and "aft," among others, are intended to refer to the orientation as illustrated and described in the figure (or figures) to which the components and directions are referencing but are not intended to imply any particular configuration.

The described embodiments of the invention provide connector assemblies that include crushable inserts for passenger seat assemblies. While the connector assemblies are discussed for use with aircraft seats, they are by no means so limited. Rather, embodiments of the connector assemblies may be used in passenger seats or other seats of any type or otherwise as desired, or may be used with other structures other than seats as desired, including but not limited to a console, wall, support structure, etc.

Figure 1:
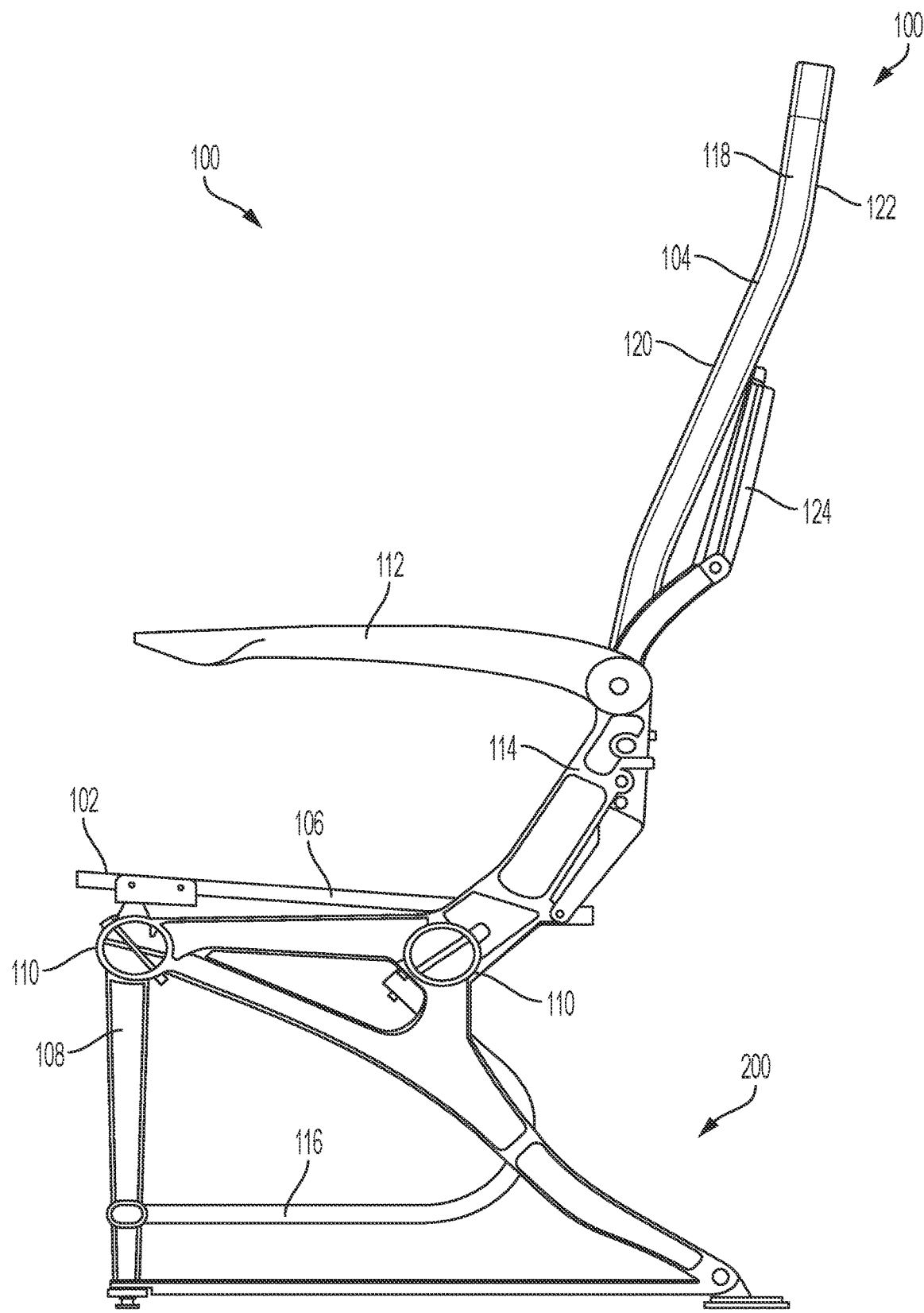
FIG. 1 is a side view of passenger seat assembly according to certain embodiments of the present invention.

As illustrated in FIG. 1, a passenger seat assembly 100 may include one or more seat bases 102 and one or more seat backs 104. The number of seat bases 102 and/or seat backs 104 should not be considered limiting on the current disclosure. In various examples, the number of seat backs 104 correspond with the number of passengers that the passenger seat is capable of carrying. In the example of FIG. 1, the passenger seat assembly 100 is capable of carrying one passenger, and accordingly has one seat back 104. However, in other examples, the passenger seat assembly 100 may be capable of carrying any desired number of passengers, such as one passenger, two passengers, three passengers, four passengers, or any other desired number of passengers. In these examples, the passenger seat assembly 100 can likewise have any desired number of corresponding seat backs 104.

The seat base 102 of the passenger seat assembly 100 generally includes a leg assembly 108 and at least one base frame tube 110. The base frame tube 110 is a primary tubular frame component of the passenger seat assembly 100, meaning that is one of the elements on the primary load path from the passenger (seat belt) to the aircraft floor (tracks). Secondary frame components are not on the primary load path but may provide other structural support. Whereas base frame tubes 110 are generally straight, other frame components such as secondary frame components may be bent into various shapes in one or more planes as discussed in detail below. The seat base 102 may also include a support frame 106, an armrest 112, a divider 114, a luggage bar 116, or other components. Cushioning (not illustrated) may be provided on any of the components of the seat base 102.

The seat back 104 is connected to the seat base 102, and is often pivotable relative to the seat base 102 such that the seat back 104 can be positioned in various positions such as a taxi-takeoff-landing (TTL) position, a reclined position, etc. The seat back 104 includes a frame component 118 having a forward side 120 and an aft side 122. In some cases, other components of the passenger seat assembly 100 such as a tray table 124, an in-flight entertainment monitor, or various other components may be supported on the seat back 104. Cushioning (not illustrated) may be provided on any of the components of the seat back 104.

Figure 2:
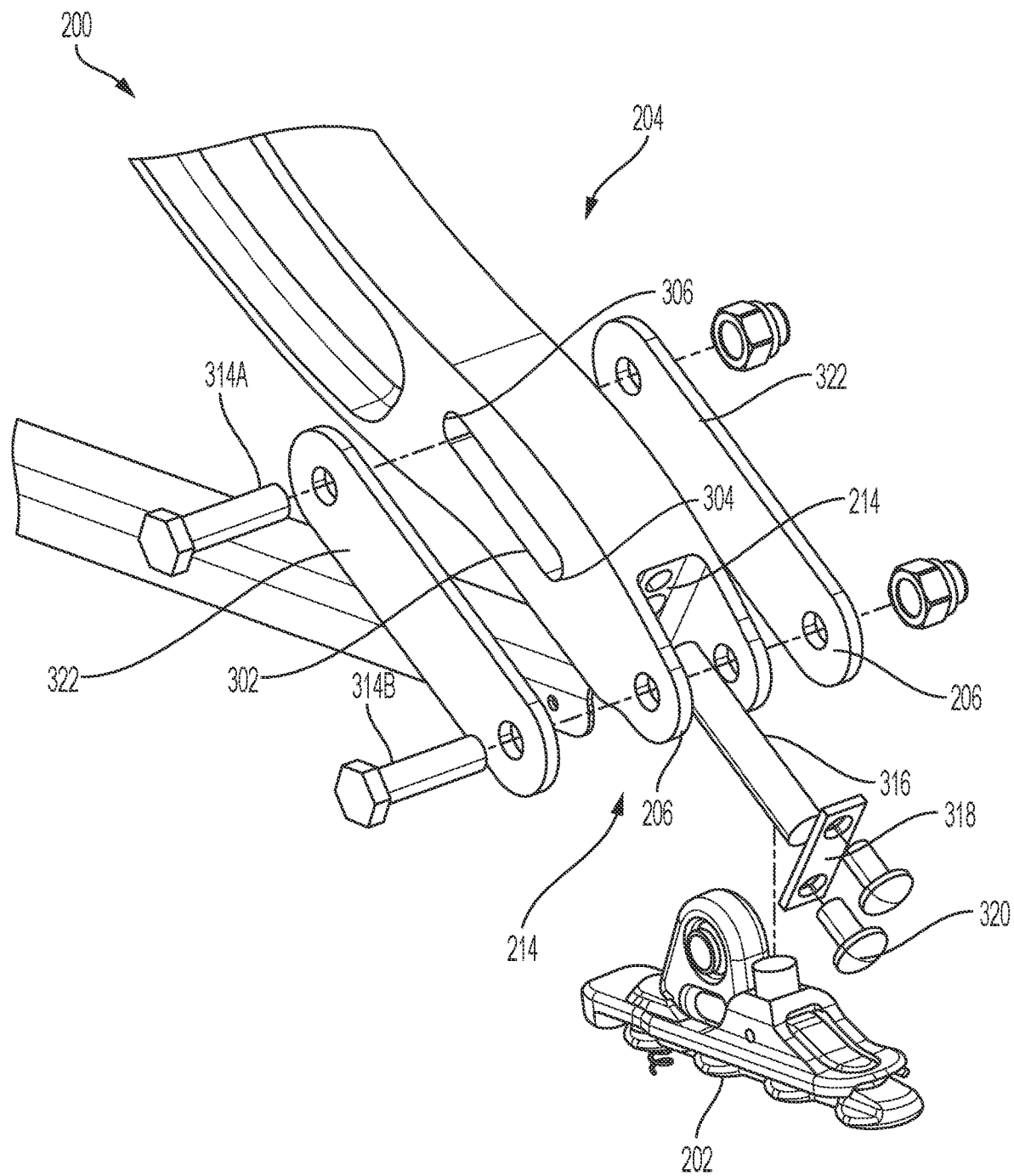
FIG. 2 illustrates a portion of a leg of the passenger seat assembly of FIG. 1 that includes a connector assembly according to certain embodiments of the present invention.

In some examples, the leg assembly 108 of the passenger seat assembly 100 may include one or more legs 200, and at least one of the legs 200 may include a connector assembly 204 (see FIG. 2). In certain embodiments, the leg 200 may be attached to the aircraft floor (or the floor of a different vehicle in which the passenger seat assembly is installed) via the connector assembly 204 and a track fitting assembly 202 (see FIG. 2). The leg 200 may be configured to fail such that energy is absorbed by the leg 200 and connector assembly 204 to minimize or prevent the passenger seat assembly 100 from detaching from the floor and/or other potential damage to the passenger seat assembly in response to the passenger seat assembly 100 experiencing a dynamic event.

FIG. 2 illustrates a portion of the leg 200, that includes various components, of a passenger seat assembly 100 according to certain embodiments of the present invention. The leg 200 includes an end 214, and in certain embodiments includes one or more projections 206 extending from the end 214. The projections 206 may define a receiving area into which a portion of the track fitting assembly 202 may be positioned. The projections 206 may also include apertures or other suitable features for selectively receiving a connector (such as connector 314A or 314B) that may connect the leg 200 with the track fitting assembly 202 (and optionally the connector assembly 204 as discussed below). The particular shape of the leg 200, end 214, and/or projections 206 should not be considered limiting.

In certain embodiments, the leg 200 includes a slot 302 proximate to the end 214. In certain embodiments, the slot 302 may extend through the leg 200 proximate to the end 214 of the leg 200 such that the slot 302 defines an opening on opposing sides of the leg 200. The slot 302 may be elongated in a direction extending away from the end 214 of the leg 200. As best illustrated in FIG. 2, the slot 302 may include a first slot end 304 and a second slot end 306. The first slot end 304 of the slot 302 may be proximate to the seat leg end 214 of the leg 200, and the second slot end 306 of the slot 302 may be opposite the first slot end 304 such that the first slot end 304 of the slot 302 is between the seat leg end 214 of the leg 200 and the second slot end 306 of the slot 302.

Figure 3A:
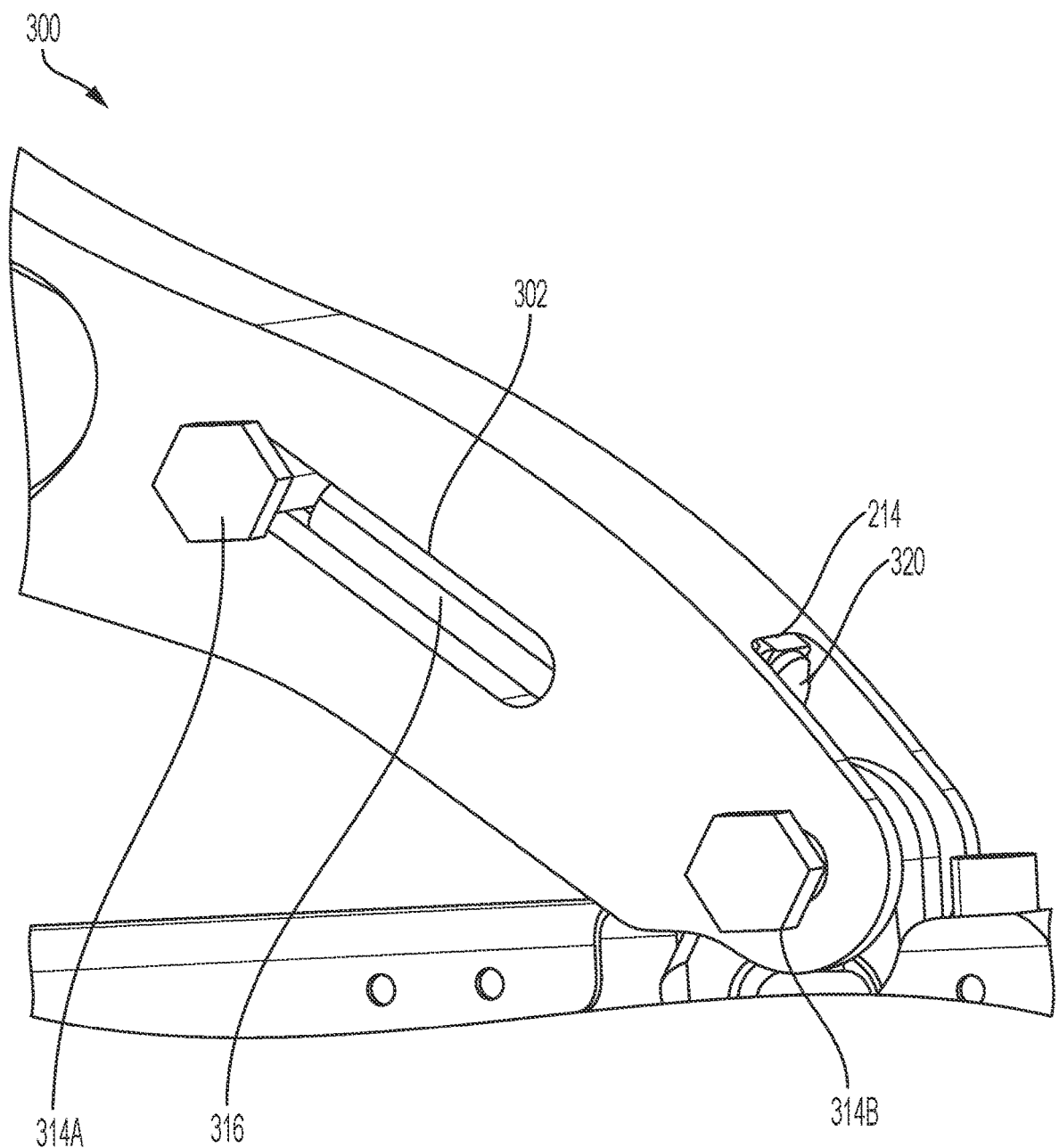
FIG. 3A is another view of the connector assembly and leg of FIG. 2.
Figure 3B:
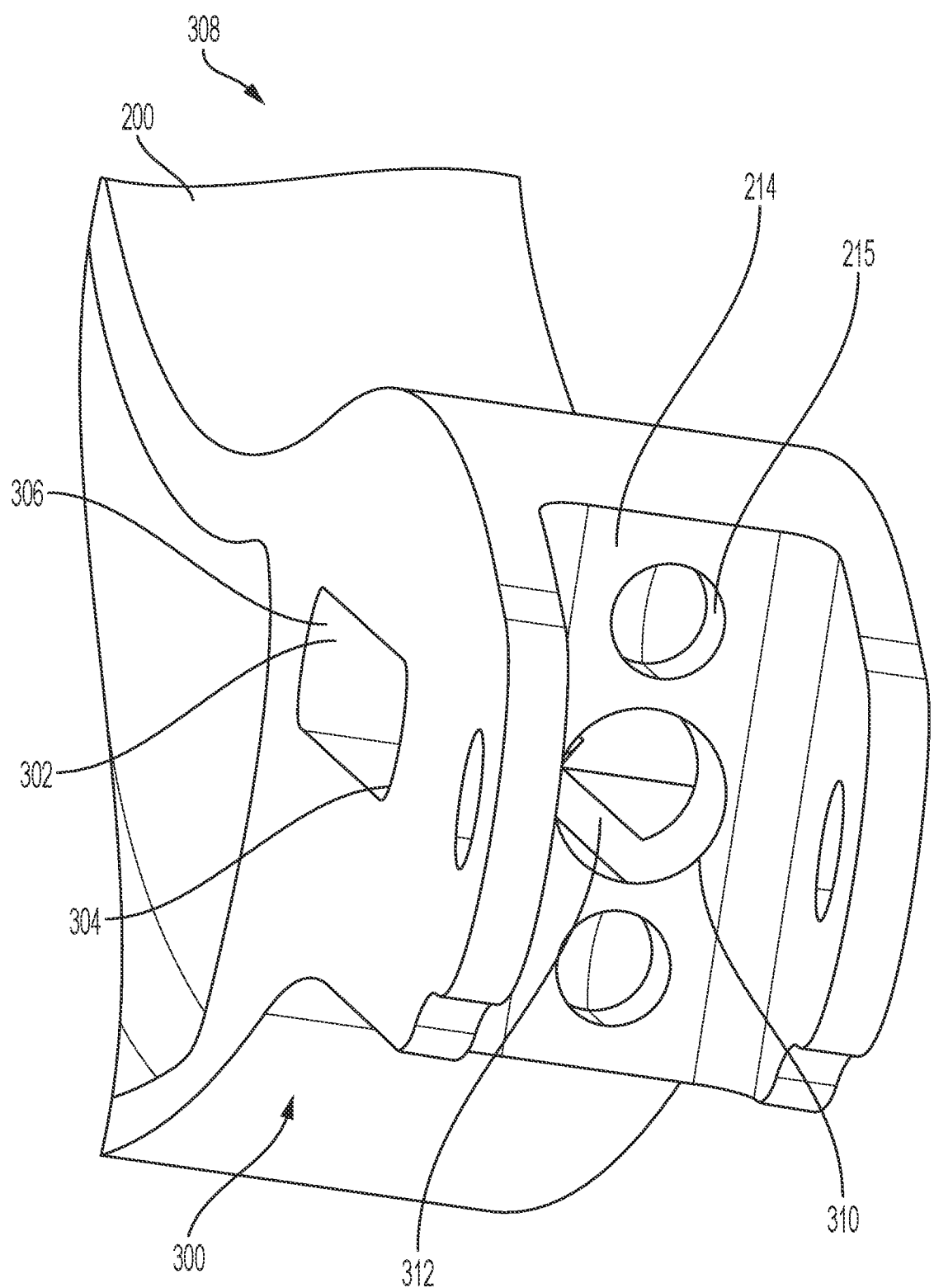
FIG. 3B is another view of the connector assembly and leg of FIG. 2.

In some embodiments, and as best illustrated in FIG. 3B, the seat leg end 214 of the leg 200 may include an aperture 310 that provides access to the slot 302 through the seat leg end 214. As discussed in detail below, the aperture 310 may allow for a crushable insert 316 to be positioned within the slot 302. In certain aspects, the slot 302 may additionally include a retaining groove 312 that may be configured to retain the crushable insert 316 within the slot 302. The retaining groove 312 may extend along the length of the slot 302, although it need not in other embodiments. In certain embodiments, a width of the regaining groove 312 is greater than a width of the slot 302, and in such embodiments the retaining groove 312 with the increased width may provide improved positioning of the crushable insert 316 within the slot 302. Optionally, the seat leg end 214 may also include one or more apertures 215 that selectively receive and engage a connector 320 of the connector assembly 204. The particular shape of the slot 302 and associated features of the slot 302 should not be considered limiting as they may have various other shapes in other embodiments as desired.

As illustrated in FIG. 2, the leg 200 may be attached to the track fitting assembly 202 and the connector assembly 204. The track fitting assembly 202 may be configured to attach the leg 200 to the floor of the aircraft (or other vehicle that includes the passenger seat assembly 100), and in certain embodiments, the leg 200 is attached to the track fitting assembly 202 at least partially via the connector assembly 204. The connector assembly 204 may be configured to be displaced such that energy is absorbed and the leg 200 remains attached to the floor when the leg 200 fails during the dynamic event.

The connector assembly 204 may include the first connector 314A, the second connector 314B, and the crushable insert 316. Optionally, the connector assembly 204 includes one or more supports 322, a retaining bracket 318, and one or more plate connectors 320.

The crushable insert 316 may be constructed from various materials that can be selectively deformed or crushed during various events such as during a dynamic event. In various embodiments, the crushable insert 316 is elongated, although the particular shape of the crushable insert 316 should not be considered limiting. The crushable insert 316 may be positioned within the slot 302 such that the crushable insert 316 extends from the first slot end 304 of the slot 302 to the second slot end 306 of the slot 302. The crushable insert 316 may be positionable within the slot 302 via the aperture 310 and optionally is positioned along the retaining groove 312. In certain embodiments, the retaining bracket 318 may be selectively secured to the seat leg end 214 via one or more plate connectors 320 to retain the crushable insert 316 within the slot 302. In certain embodiments, the retaining bracket 318 may at least partially cover or otherwise obstruct the aperture 310 at the seat leg end 214.

In certain embodiments, the first connector 314A may be positioned within the slot 302 between the second slot end 306 and the crushable insert 316. The second connector 314B may extend through apertures in the projections 206 and/or may otherwise connect the leg 200 with the track fitting assembly 202. In certain embodiments, the one or more supports 322 may connect the connectors 314A-B. Optionally, the one or more supports 322 may maintain a connection between the connectors 314A-B when the passenger seat 100 undergoes a dynamic event. The supports 322 may be constructed from various materials as desired. In one non-limiting example, the supports 322 are constructed from metal. When included, the one or more supports 322 may optionally at least partially cover the slot 302 to further retain the crushable insert 316 within the slot 302.

The connector assembly 300 may be configured to deform the crushable insert 316 in response to the passenger seat assembly 100 experiencing the dynamic event. For example, subsequent to the passenger seat assembly 100 experiencing the dynamic event, the seat leg end 214 of the leg 200 may fail, causing the connector assembly 300 to deform the crushable insert 316. In some examples, the connector assembly 300 may be displaced, in response to the seat leg end 214 of the leg 200 failing, such that the first connector 314A slides along the slot 302 towards the first slot end 304 of the slot 302 to deform the crushable insert 316 (or conversely the seat leg end 214 is deformed towards the second slot end 306 of the slot 302). The deformation of the crushable insert 316 may increase the duration of the dynamic event and thereby minimize or reduce other potential damage to the leg 200 and/or passenger seat assembly 100. After the crushable insert 316 has been deformed, the crushable insert 316 may remain attached to the connector assembly 300 via the retaining bracket 318, and the passenger seat assembly 100 may remained attached to the floor of the vehicle via the track fitting assembly 202.

Figure 4:
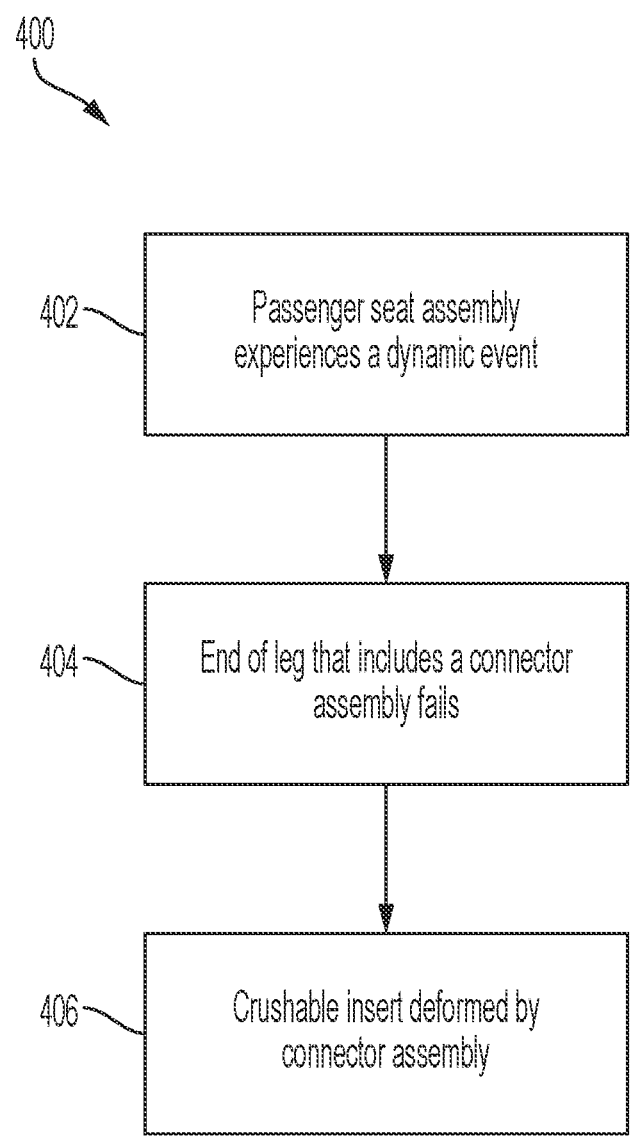
FIG. 4 is a flowchart of a process for deforming a crushable insert during a dynamic event according to certain embodiments of the present invention.

FIG. 4 is a flowchart of a process 400 for deforming a crushable insert 316 during a dynamic event to absorb energy according to certain embodiments of the present invention. At block 402, the process 400 involves the passenger seat assembly 100 experiencing a dynamic event. The dynamic event may include turbulence, collisions, large swells, or other dynamic events that involve large transfers of energy over short periods of time. The dynamic event may expose the passenger seat assembly 100 to an amount of energy that, for typical passenger seats without the connector assembly 300, may cause damage to a vehicle in which the passenger seat assembly 100 is installed, may cause bodily injury, or a combination thereof.

At block 404, the process 400 involves the seat leg end 214 of the leg 200 failing due to the dynamic event. The seat leg end 214 of the leg 200 may fail in response to receiving the amount of energy from the dynamic event. The seat leg end 214 of the leg 200 may fail by being displaced past a normal range of motion of the leg 200. And, once displaced past the normal range of motion, the seat leg end 214 of the leg 200 may displace such that the connector assembly 300 additionally displaces.

At block 406, the process 400 involves deforming the crushable insert 316. The crushable insert 316 may be included in the connector assembly 300, and, in response to the seat leg end 214 of the leg 200 failing, the crushable insert 316 may be deformed to absorb energy from the dynamic event. Once the seat leg end 214 of the leg 200 fails, the connector assembly 300 may displace such that the connector assembly 300 deforms the crushable insert 316. After the crushable insert 316 has been deformed, the crushable insert 316 may remain attached to the connector assembly 300 via the retaining bracket 318, and the passenger seat assembly 100 may remained attached to the floor of the vehicle via the track fitting assembly 202. In some examples, the connector assembly 300 may displace by rotating about the seat leg end 214 of the leg 200 such that the first connector 314A of the connector assembly 204 compresses, crushes, or otherwise deforms the crushable insert 316. In other examples, the connector assembly 300 may displace such that the first connector 314A slides along the slot 302 from the second slot end 306 of the slot 302 toward the first slot end 304 of the slot 302 to deform the crushable insert 316.

A collection of exemplary embodiments are provided below, including at least some explicitly enumerated as "Examples" providing additional description of a variety of example embodiments in accordance with the concepts described herein. These examples are not meant to be mutually exclusive, exhaustive, or restrictive; and the disclosure not limited to these examples but rather encompasses all possible modifications and variations within the scope of the issued claims and their equivalents.

Example 1. A passenger seat assembly comprising: a leg, a crushable insert, and a connector assembly, wherein the leg comprises a seat leg end and a slot extending through the leg proximate to the seat leg end, wherein the slot is elongated in a direction extending away from the seat leg end and comprises a first slot end proximate to the seat leg end and a second slot end opposite from the first slot end such that the first slot end is between the second slot end and the seat leg end, wherein the crushable insert is retained within the slot, wherein the connector assembly is configured to connect the leg with a track fitting assembly, wherein the connector assembly comprises a connector extending at least partially through the slot between the second slot end and the crushable insert, and wherein the connector is configured to deform the crushable insert during a dynamic event.

Example 2. The passenger seat assembly of any of the preceding or subsequent examples or combination of examples, wherein the connector of the connector assembly is a first connector, wherein the connector assembly further comprises a second connector and a support, wherein the support connects the first connector with the second connector, and wherein the second connector is configured to connect the leg with the track fitting assembly.

Example 3. The passenger seat assembly of any of the preceding or subsequent examples or combination of examples, further comprising the track fitting assembly.

Example 4. The passenger seat assembly of any of the preceding or subsequent examples or combination of examples, wherein the connector is configured to move within the slot during the dynamic event.

Example 5. The passenger seat assembly of any of the preceding or subsequent examples or combination of examples, wherein the leg further comprises an aperture in the seat leg end providing access to the slot, and wherein the crushable insert is insertable into the slot via the aperture.

Example 6. The passenger seat assembly of any of the preceding or subsequent examples or combination of examples, further comprising a retaining bracket coupled to the seat leg end and covering aperture, wherein the retaining bracket is configured to retain the crushable insert within the slot.

Example 7. A passenger seat assembly comprising: a leg and a connector assembly, wherein the leg comprises a seat leg end and a slot extending through the leg, and wherein the connector assembly comprises a first connector, a second connector, and a support, wherein the support connects the first connector and the second connector, wherein the first connector is retained at least partially within the slot, wherein the first connector is movable within the slot during a dynamic event, and wherein the second connector is configured to connect the seat leg end with a track fitting assembly.

Example 8. The passenger seat assembly of any of the preceding or subsequent examples or combination of examples, further comprising a crushable insert retained within the slot, wherein the first connector is between a first slot end of the slot and the crushable insert, and wherein the first connector is configured to deform the crushable insert during the dynamic event.

Example 9. The passenger seat assembly of any of the preceding or subsequent examples or combination of examples, wherein the leg further comprises an aperture in the seat leg end providing access to the slot, and wherein a crushable insert is insertable into the slot via the aperture.

Example 10. The passenger seat assembly of any of the preceding or subsequent examples or combination of examples, further comprising a retaining bracket coupled to the seat leg end and covering aperture and the crushable insert, wherein the retaining bracket is configured to retain the crushable insert within the slot.

Example 11. The passenger seat assembly of any of the preceding or subsequent examples or combination of examples, further comprising the track fitting assembly.

Example 12. The passenger seat assembly of any of the preceding or subsequent examples or combination of examples, wherein the support of the connector assembly at least partially covers the slot.

Example 13. The passenger seat assembly of any of the preceding or subsequent examples or combination of examples, wherein the slot extends through the leg from a first side of the leg to a second side of the leg.

Example 14. The passenger seat assembly of any of the preceding or subsequent examples or combination of examples, wherein the slot comprises a retaining groove within the slot and extending along a length of the slot, and wherein a width of the slot is less than a width of the retaining groove.

Example 15. A passenger seat assembly comprising: a leg, a crushable insert, and a connector assembly, wherein the leg comprises a seat leg end and a slot extending through the leg proximate to the seat leg end, wherein the slot is elongated in a direction extending away from the seat leg end and comprises a retaining groove extending along a length of the slot, wherein the crushable insert is retained within the slot and within the retaining groove, wherein the connector assembly is configured to connect the leg with a track fitting assembly, wherein the connector assembly comprises a connector extending at least partially through the slot, and wherein the connector is configured to deform the crushable insert during a dynamic event.

Example 16. The passenger seat assembly of any of the preceding or subsequent examples or combination of examples, wherein the slot comprises a first slot end proximate to the seat leg end and a second slot end opposite from the first slot end such that the first slot end is between the second slot end and the seat leg end, and wherein the connector extends through the slot between the crushable insert and the second slot end.

Example 17. The passenger seat assembly of any of the preceding or subsequent examples or combination of examples, wherein a width of the slot is less than a width of the retaining groove.

Example 18. The passenger seat assembly of any of the preceding or subsequent examples or combination of examples, wherein the connector of the connector assembly is a first connector, wherein the connector assembly further comprises a second connector and a support, wherein the support connects the first connector with the second connector, and wherein the second connector is configured to connect the leg with the track fitting assembly.

Example 19. The passenger seat assembly of any of the preceding or subsequent examples or combination of examples, further comprising the track fitting assembly.

Example 20. The passenger seat assembly of any of the preceding or subsequent examples or combination of examples, wherein the leg further comprises an aperture in the seat leg end providing access to the slot, and wherein the crushable insert is insertable into the slot via the aperture.

Different arrangements of the components depicted in the drawings or described above, as well as components and steps not shown or described, are possible. Similarly, some features and sub-combinations are useful and may be employed without reference to other features and sub-combinations. Embodiments of the invention have been described for illustrative and not restrictive purposes, and alternative embodiments may become apparent to readers of this patent. Accordingly, the present invention is not limited to the embodiments described above or depicted in the drawings, and various embodiments and modifications may be made without departing from the scope of the claims below.

That which is claimed is:

1. A passenger seat assembly comprising:
a leg comprising a seat leg end and a slot extending through the leg from a first side of the leg to a second side of the leg and proximate to the seat leg end, the slot defining openings in the first side and the second side of the leg, wherein the slot is elongated in a direction extending away from the seat leg end and comprises a first slot end proximate to the seat leg end and a second slot end opposite from the first slot end such that the first slot end is between the second slot end and the seat leg end, and wherein the leg further comprises an aperture in the seat leg end providing access to the slot;
a crushable insert retained within the slot, wherein the crushable insert is insertable into the slot via the aperture; and
a connector assembly configured to connect the leg with a track fitting assembly, wherein the connector assembly comprises a connector and a support, wherein the connector extends at least partially through the slot between the second slot end and the crushable insert and from the first side of the leg to the second side of the leg, wherein the connector is configured to deform the crushable insert during a dynamic event, wherein the support at least partially covers the slot and extends towards the track fitting assembly.

2. The passenger seat assembly of claim 1, wherein the connector of the connector assembly is a first connector, and wherein the connector assembly further comprises a second connector, wherein the support connects the first connector with the second connector, and wherein the second connector is configured to connect the leg with the track fitting assembly.

3. The passenger seat assembly of claim 1, further comprising the track fitting assembly.

4. The passenger seat assembly of claim 1, wherein the connector is configured to move within the slot during the dynamic event.

5. The passenger seat assembly of claim 1, further comprising a retaining bracket coupled to the seat leg end and covering aperture, wherein the retaining bracket is configured to retain the crushable insert within the slot.

6. A passenger seat assembly comprising:
a leg comprising a seat leg end and a slot extending through the leg from a first side of the leg to a second side of the leg, wherein the leg further comprises an aperture in the seat leg end providing access to the slot, and wherein a crushable insert is insertable into the slot via the aperture; and
a connector assembly comprising:
a first connector;
a second connector; and
a support connecting the first connector and the second connector and at least partially covering the slot,
wherein the first connector is at least partially retained within the slot and extends from the first side to the second side of the leg,
wherein the first connector is movable within the slot during a dynamic event, and
wherein the second connector is configured to connect the seat leg end with a track fitting assembly.

7. The passenger seat assembly of claim 6, further comprising a crushable insert retained within the slot, wherein the first connector is between a first slot end of the slot and the crushable insert, and wherein the first connector is configured to deform the crushable insert during the dynamic event.

8. The passenger seat assembly of claim 6, further comprising a retaining bracket coupled to the seat leg end and covering aperture and the crushable insert, wherein the retaining bracket is configured to retain the crushable insert within the slot.

9. The passenger seat assembly of claim 6, further comprising the track fitting assembly.

10. The passenger seat assembly of claim 6, wherein the slot comprises a retaining groove within the slot and extending along a length of the slot, and wherein a width of the slot is less than a width of the retaining groove.

11. A passenger seat assembly comprising:
a leg comprising a seat leg end and a slot extending through the leg proximate to the seat leg end, wherein the slot is elongated in a direction extending away from the seat leg end and comprises a retaining groove extending along a length of the slot, wherein the leg further comprises an aperture in the seat leg end providing access to the slot;
a crushable insert retained within the slot and within the retaining groove, wherein the crushable insert is insertable into the slot via the aperture; and
a connector assembly configured to connect the leg with a track fitting assembly, wherein the connector assembly comprises a connector extending at least partially through the slot, wherein the connector is configured to deform the crushable insert during a dynamic event.

12. The passenger seat assembly of claim 11, wherein the slot comprises a first slot end proximate to the seat leg end and a second slot end opposite from the first slot end such that the first slot end is between the second slot end and the seat leg end, and wherein the connector extends through the slot between the crushable insert and the second slot end.

13. The passenger seat assembly of claim 11, wherein a width of the slot is less than a width of the retaining groove.

14. The passenger seat assembly of claim 11, wherein the connector of the connector assembly is a first connector, and wherein the connector assembly further comprises a second connector and a support, wherein the support connects the first connector with the second connector, and wherein the second connector is configured to connect the leg with the track fitting assembly.

15. The passenger seat assembly of claim 11, further comprising the track fitting assembly.

* * * * *